United States Patent
Dumais

[19]

[11] Patent Number: 5,899,291
[45] Date of Patent: May 4, 1999

[54] THREE WHEEL MOTORCYCLE

[76] Inventor: Albert L. Dumais, 4121 W. McDowell Rd., Apt. 139, Phoenix, Ariz. 85009

[21] Appl. No.: 08/897,518

[22] Filed: Jul. 21, 1997

[51] Int. Cl.$^6$ ............................. B62D 61/12; B62K 13/00
[52] U.S. Cl. ............................................. 180/209; 180/210
[58] Field of Search ..................................... 180/209, 210

[56]  References Cited

U.S. PATENT DOCUMENTS

| | | |
|---|---|---|
| 1,933,102 | 10/1933 | DuPont et al. . |
| 1,956,319 | 4/1934 | DuPont et al. . |
| 3,948,335 | 4/1976 | Vetter . |
| 4,287,960 | 9/1981 | McConnell . |
| 4,325,449 | 4/1982 | D'Addio et al. ........................ 280/210 |
| 4,437,535 | 3/1984 | Winchell et al. . |
| 5,116,069 | 5/1992 | Miller ..................................... 280/210 |
| 5,236,060 | 8/1993 | Huber . |
| 5,499,689 | 3/1996 | Johnson ................................. 280/209 |
| 5,529,141 | 6/1996 | Lehman et al. . |
| 5,692,577 | 12/1997 | Dornbusch et al. .................... 280/209 |

*Primary Examiner*—Kenneth R. Rice
*Attorney, Agent, or Firm*—Blodgett & Blodgett, P.C.

[57] ABSTRACT

A conversion assembly for converting a two-wheel motorcycle to a three-wheel motorcycle in which the rear wheel fork of the motorcycle has been removed. The conversion assembly includes a sub-frame for attachment to the frame of the motorcycle and a pair of rear forks operatively connected to the frame. An axle is mounted on each fork and a wheel hub is operatively mounted on the axle for supporting a rear wheel. One of the wheel hubs and its wheel is free wheeling. The other hub and its wheel is operatively connected to the drive members of the motorcycle by a drive connector. More specifically, the drive connector includes a drive shaft which is drivenly connected to the drive elements of the motor cycle and the coupler for fixing one end of the drive shaft with one of the wheel hubs.

8 Claims, 4 Drawing Sheets

THREE WHEEL MOTORCYCLE

STATEMENT REGARDING FEDERALLY SPONSORED RESEARCH OR DEVELOPMENT

This invention has been created without the sponsorship or funding of any federally sponsored research or development program.

BACKGROUND OF THE INVENTION

The present invention is directed to a three-wheel motorcycle and a conversion assembly for converting a two-wheel motorcycle to a three-wheel motorcycle.

Motorcycles provide simple economical transportation. They are also a source of recreation. A two-wheel motorcycle is inherently less stable and more hazardous than three or four-wheeled vehicles. For most people who enjoy, or prefer to ride motorcycles, the two-wheel motorcycle is preferred by a wide margin. It is more economical, simpler, easier to maneuver and to negotiate in traffic. However, for a sizable class of people who would like to drive a motorcycle, the two-wheel motorcycle is too difficult or too dangerous. Included in this class of people are elderly individuals who lack the strength or athleticism to drive the motorcycle with safety, as well as handicapped individuals.

Three-wheel motorcycles have been marketed in the past. The three-wheel motorcycle is substantially more expensive than its two-wheel counterpart, thereby off-setting the advantage of a motorcycle. The three-wheel motorcycle takes one of two forms. One type of three-wheel motorcycle maintains the basic construction of a two-wheel motorcycle, wherein one rear wheel is directly behind the single front wheel and a second rear wheel is located to one side of the normal front to rear wheel line of alignment. The second rear wheel typically supports a "sidecar" for storage purposes, or for supporting a passenger or individual other than the driver.

A second type of three-wheel motorcycle represents a more radical change from the standard two-wheel motorcycle. This second type has two spaced rear wheels which are on opposite sides of the line of alignment of the front wheel. Both rear wheels are driven through a differential. The differential is a rigid assembly, without shock suspension.

Conversion kits have also been developed and marketed for converting a two-wheel motorcycle to a three-wheel motorcycle. These kits are relatively complicated and expensive and require someone with a fair degree of mechanical ability to make the conversion. The hiring of a mechanic to make the conversion represents an additional cost for the customer. These and other difficulties experienced with the prior art three-wheel motorcycles have been obviated by the present invention.

It is, therefor, a principal object of the invention to provide a conversion kit or assembly for converting a two-wheel motorcycle to a three-wheel motorcycle which is simple in construction and relatively easy to install.

A further object of the invention is the provision of a conversion kit for converting a two-wheel motorcycle to a three-wheel motorcycle which utilizes the conventional drive elements of the motorcycle for driving one of the rear wheels.

Another object of the invention is the provision of a motorcycle which has been converted from a two-wheel motorcycle to a three-wheel motorcycle, wherein one of the two rear wheels is driven by the conventional drive elements of the motorcycle.

A still further object of the invention is the provision of a conversion kit for converting a two-wheel motorcycle to a three-wheel motorcycle which includes a unique drive connector for drivingly connecting the hub of one of the rear wheels to the convention drive elements of the motorcycle.

With these and other object in view, as will be apparent to those skilled in the art, the invention resides in the combination of parts set forth in the specification and covered by the claims appended hereto.

BRIEF SUMMARY OF THE INVENTION

A conversion assembly for converting a two-wheel motorcycle to a three-wheel motorcycle in which the rear wheel fork of the motorcycle has been removed. The conversion assembly includes a sub-frame for attachment to the frame of the motorcycle and a pair of rear forks operatively connected to the frame. One of the rear forks is the original rear fork of the motorcycle. An axle is mounted on the right fork and a wheel hub is operatively mounted on the axle for supporting one of the rear wheels. This wheel hub and its wheel are free wheeling. The other hub for supporting the second rear wheel is operatively connected to the drive members of the motorcycle by a drive connector. More specifically, the drive connector includes a drive shaft which is drivenly connected to the drive elements of the motorcycle and a coupler for fixing one end of the drive shaft with one of the wheel hubs. The resulting conversion is an individually suspended two rear wheel assembly

BRIEF DESCRIPTION OF THE DRAWINGS

The character of the invention, however, may be best understood by reference to one of its structural forms, as illustrated by the accompanying drawings, in which.

DETAILED DESCRIPTION OF THE INVENTION

Figure 1:
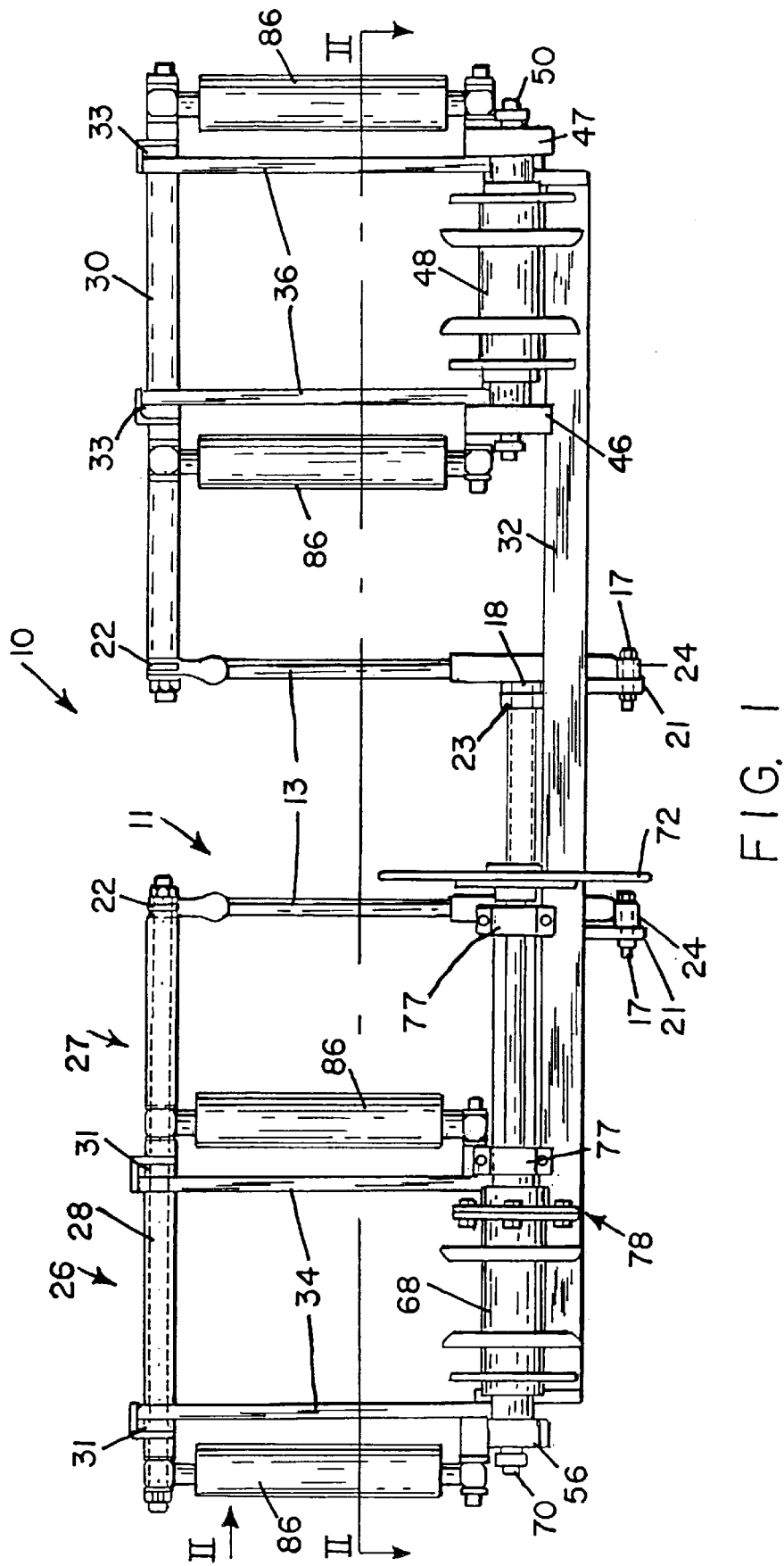
FIG. 1 is a rear elevational view of the conversion assembly of the present invention shown applied to the main frame of a conventional two-wheeled motorcycle.
Figure 3:
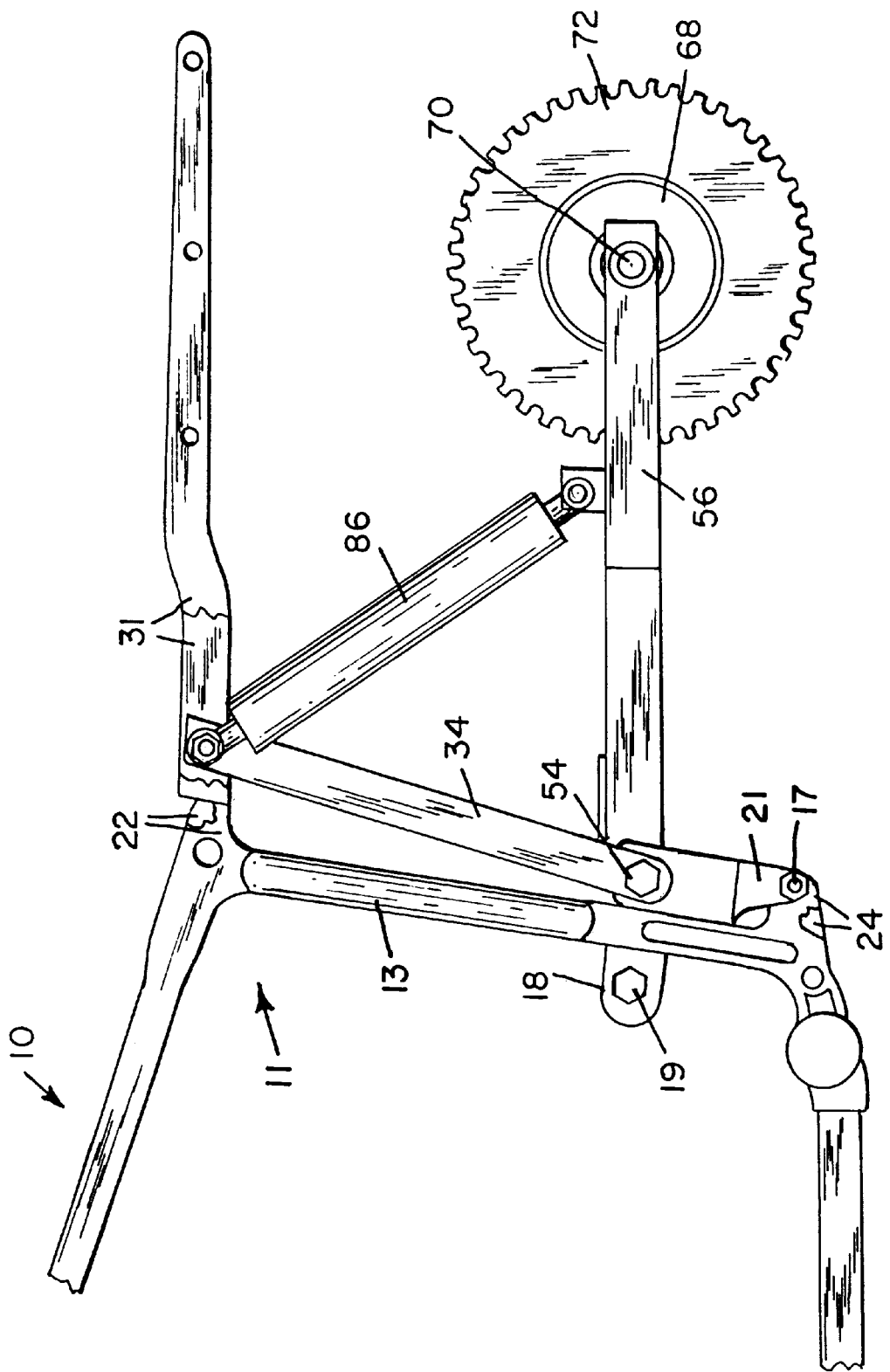
FIG. 3 is a side elevational view of the conversion assembly and looking in the direction of arrow III of FIG. 1.

Referring first to FIGS. 1 and 3, there is shown part of the frame of a motorcycle, generally indicated by the reference numeral 10, which includes a front wheel fork, not shown, and a main frame 11 which normally supports a rear wheel fork. The main frame 11 also comprises a pair of upper rearwardly extending support brackets 22, a pair of forwardly extending intermediate support brackets 18, a pair of rearwardly extending support brackets 23, a pair of lower rearwardly extending support brackets 24 and a pair of spaced vertical struts 13 between the brackets 18 and 22. Each bracket 18 has an aperture for receiving an axle pin. The end of the axle pin is threaded. The aperture in one of the brackets 18 has internal threads for engagement with the external threads at the end of the axle pin. The rear wheel fork of the motorcycle has a tubular front fixture which is pivotally supported on the axle pin. The rear wheel fork is removed from the brackets 18 prior to application of the assembly of the present invention.

Figure 2:
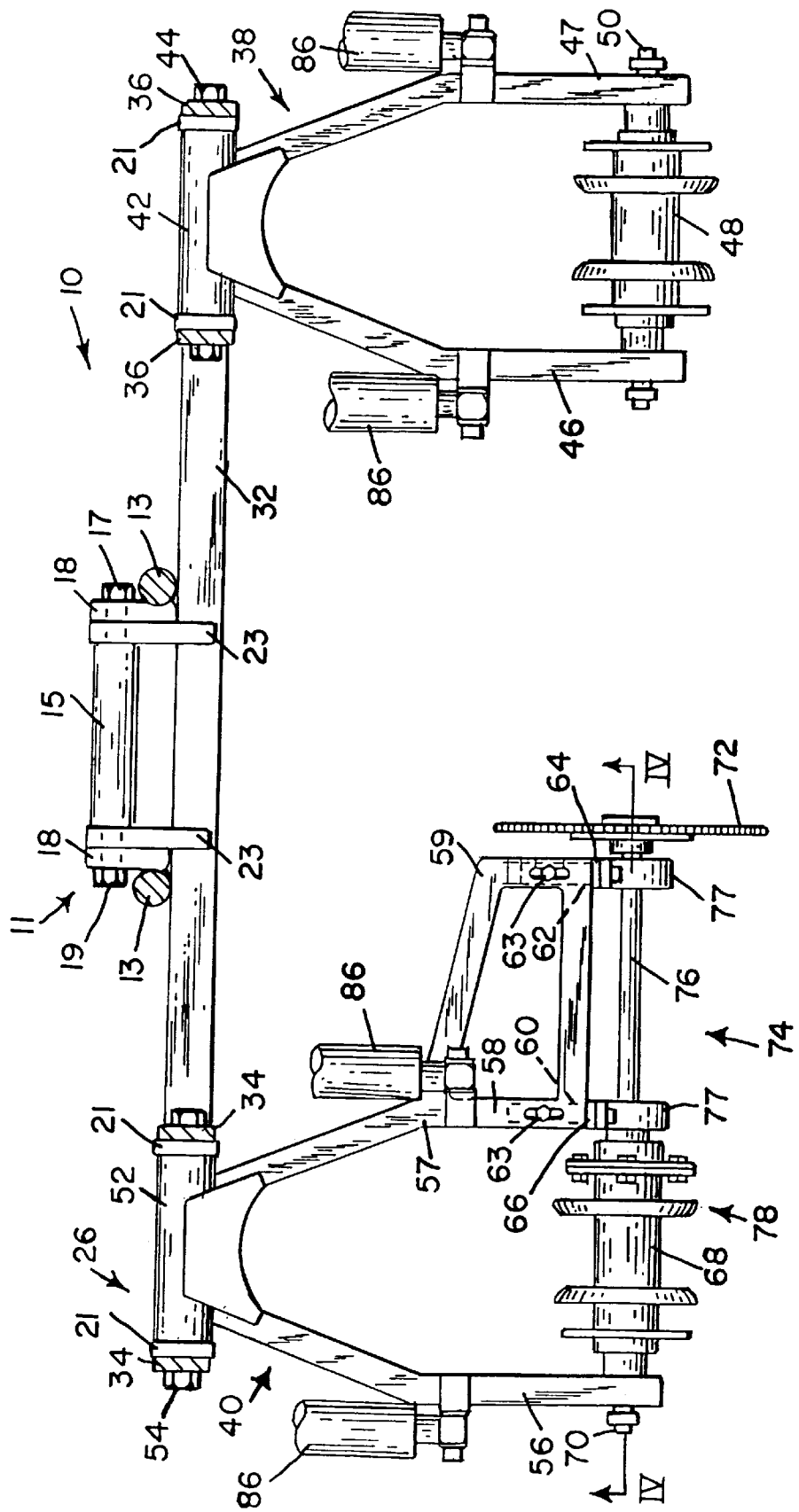
FIG. 2 is a horizontal cross-sectional view of the conversion assembly taken along the line II—II of FIG. 1 and looking in the direction of the arrows.

Referring to FIGS. 1–3, the conversion assembly of the present invention is generally indicated by the reference numeral 26 and is shown mounted to the support brackets 18, 22, and 24 of the main frame 11 of the motorcycle from which the rear wheel fork has been removed. The conversion assembly includes a sub-frame, generally indicated by the reference numeral 27, which includes a first upper horizontal support assembly 30 and a second upper horizontal support assembly 28. The assemblies 28 and 30 are fixed to the support brackets 22 of the main frame 11. The first upper horizontal support assembly 30 supports a first pair of fender brackets 33 which support a first rear fender, not shown. The second upper horizontal support assembly 28 support a first pair of fender brackets 33 which support a second rear fender, not shown. The fender brackets 31 and 33 also support a horizontal cargo bed, not shown. A tubular lower support beam 32 is operatively connected to the support brackets 18 and 24 of the main frame and is connected to the support assembly 28 by a pair of upright supports 34 and to the support assembly 30 by a pair of upright supports 36. The upright supports 34 and 36 are fixed to the support assemblies 28 and 30 by, as for example, welding.

Referring particularly to FIG. 2, the brackets 18 are fixed to a pair of connecting brackets 23 by a bolt 19 and a nut 17. A tubular stiffening member, or spacer 15, extends between the connecting brackets 23. The bolt 19 extends through apertures in the connecting brackets 23 and the support brackets 18, as well as the bore of the tubular stiffening member 15 The connecting brackets 23 are fixed to the lower support beam 32 by welding. The support brackets 24 are fixed to connecting brackets 21 by bolts 17. The connecting brackets 21 are, in turn, fixed to the lower support beam 32 by, for example, welding.

A first rear wheel fork, generally indicated by the reference numeral 38, is pivotally connected to the upright supports 36. A second rear wheel fork, generally indicated by the reference numeral 40, is pivotally connected to the upright supports 34. The first rear wheel fork 38 is a conventional rear wheel fork. The rear wheel fork which was originally removed from the motorcycle is used as the first rear wheel fork 38. The first rear wheel fork 38 includes a forward tubular fixture 42 which is pivotally mounted on a pivot pin 44 which is supported between the upright supports 36. The first rear wheel fork 38 has a pair of rearwardly extending arms 46 and 47 which support a first rear wheel axle 50. A first rear wheel hub 48 is rotatably mounted on the axle 50 for supporting a first rear wheel, not shown.

Figure 4:
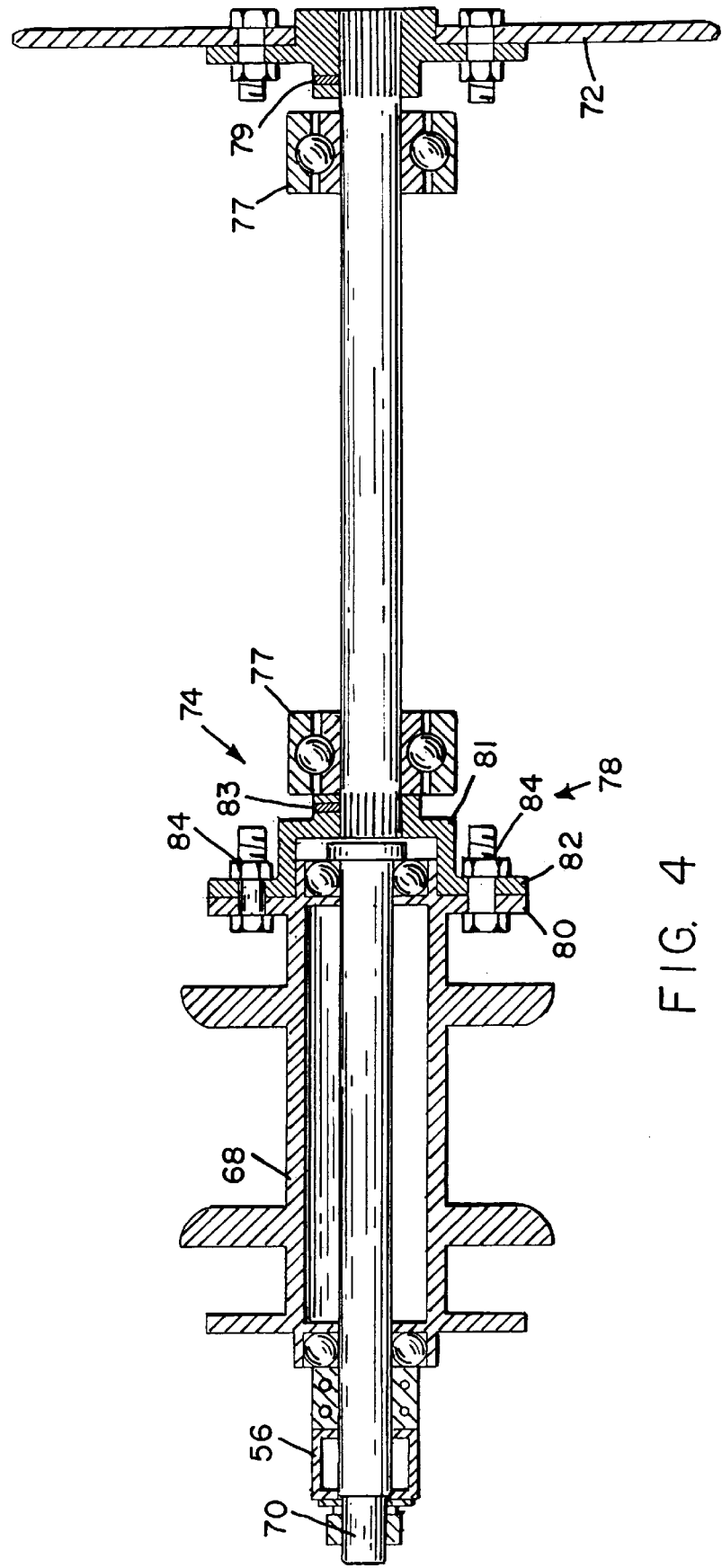
FIG. 4 is a horizontal cross-sectional view of the driven rear wheel hub and the drive elements of the rear wheel hub, taken along the line IV—IV of FIG. 3 and looking in the direction of the arrows.

The second rear wheel fork 40 has a tubular forward fixture 52, pivotally mounted on a horizontal pivot pin 54 which is supported on the upright supports 34. The second rear wheel fork 40 has a pair of rearwardly extending arms 56 and 57. The arm 57 is connected to a second pair of rearwardly extending arms 58 and 59. The arms 58 and 59 have rearwardly facing bores 60 and 62, respectively, for receiving support arms 66 and 64, respectively The support arms 66 and 64 are locked in placed by locking screws 63. The arm 56 constitutes an outer support arm. The arm 64 constitutes an inner support arm. The arm 66 constitutes an intermediate support arm. A pillow bearing 77 is fastened to the end of each support arm 64 and 66 and mounted on the shaft 76. Although roller bearings 69 are illustrated in FIG. 4 for mounting hub 69 on axle 70, it is preferred that rollers bearings be employed.

A second rear wheel hub 68 is rotatably mounted on a second rear wheel axle 70. The outer end of the axle 70 is fixedly supported on the outer support arm 56. The second rear wheel hub 68 is rotatably driven from a conventional driven member of the motorcycle such as a sprocket 72 acting through a drive connector generally indicated by the reference numeral 74. The sprocket 72 is a conventionally driven sprocket which is rotatably driven from a conventional driving sprocket and driving chain of the motorcycle. The sprocket 72 is rotatably connected to the inner end of a drive shaft 76 by means of a spliced shaft and hub fixed in position by a set screw 79. The outer end of the drive shaft 76 is rotatably connected to a coupler, generally indicated by the reference numeral 78, and is rotatably supported by the support arms 64 and 66. The coupler 78 includes an outer vertical flange 80 which is fixed to the second rear wheel hub 68 and an inner vertical flange 82 of a coupling member 81 which is fixed to the flange 80 by fasteners 84. The coupling member 81 is rotatably connected to the drive shaft 76 by a spline connection between the shaft 76 and the coupling member 81 and held in place by a set screw 83. Shock connectors 86 connect the upper support assembly 28 to the second rear wheel fork 40 and the first upper support assembly 30 to the first rear wheel fork 38.

What is claimed is:

1. A conversion assembly for converting a two wheeled motorcycle to a three wheeled motorcycle, said two wheeled motorcycle having a frame, a rear wheel fork mounted on said frame for supporting a rear wheel, a driving member, a driven member operatively connected to the rear wheel, and a drive transmitter operatively connected to said driving member and to said driven member, said conversion assembly being adapted to replace said rear wheel fork and comprising:

(a) a sub frame for attachment to the frame of a motorcycle;
   (b) a first rear fork fixed to said sub frame;
   (c) a second rear fork fixed to said sub frame and spaced from said first sub frame for supporting said driven member;
   (d) a first rear axle mounted on said first rear fork;
   (e) a second rear axle mounted on said second rear fork;
   (f) a first rear wheel hub rotatably mounted on said first rear axle for supporting a first rear wheel so that said first wheel is free wheeling;
   (g) a second rear wheel hub rotatably mounted on said second rear axle for supporting a second rear wheel; and
   (h) a drive connector for operatively connecting said driven member to said second rear wheel hub.

2. A conversion assembly as recited in claim 1, wherein said second rear axle has an outer end and an inner end, wherein said second rear wheel hub has an inner end and an outer end, wherein said second rear fork has an outer support arm for fixedly supporting the outer end of said second rear axle, an inner support arm spaced form said first support arm, and an intermediate support arm located between said inner support arm and said outer support arm, and wherein said drive connector comprises:

(a) a drive shaft having an inner end which is fixed to said driven member and rotatably supported on said inner support arm and outer end which is rotatably supported on said intermediate support arm;
   (b) a coupler for fixing the outer end of said drive shaft to the inner end of said second rear wheel hub for rotatably supporting the inner end of said second wheel hub on said intermediate support arm and the inner end of said second rear axle is supported by the inner end of said second rear wheel hub.

3. A conversion assembly as recited in claim 2, wherein said coupler comprises:

(a) an outer vertical flange fixed to the inner end of said second rear wheel hub;

(b) an inner vertical flange fixed to the outer end of said drive shaft; and (c) fastening means for fixing said outer vertical flange to said inner vertical flange.

4. A conversion assembly as recited in claim 1, wherein each of said first and second rear axles is mounting on said sub frame for pivoting about a horizontal axis and said conversion assembly further comprises shock connectors between said sub frame and each of said first and second rear axles.

5. A three wheel motorcycle comprising:

(a) a main frame;

(b) an engine supported on the main frame;

(c) a front wheel rotatably supported on said main frame;

(d) a driving member operatively connected to said engine;

(e) a sub frame connected to said main frame;

(f) a first rear fork fixed to said sub frame;

(g) a second rear fork fixed to said sub frame and spaced from said first sub frame for rotatably supporting said driven member;

(h) a first rear axle mounted on said first rear fork;

(i) a second rear axle mounted on said second rear fork;

(j) a first rear wheel hub rotatably mounted on said first rear axle for supporting a first rear wheel so that said first wheel is free wheeling;

(k) a second rear wheel hub rotatably mounted on said second rear axle for supporting a second rear wheel;

(l) a driven member rotatably mounted on said second rear fork;

(m) a drive transmitter operatively connected to said driving member and to said driven member; and (n) a drive connector for operatively connecting said driven member to said second rear wheel hub.

6. A three wheel motorcycle as recited in claim 5, wherein said second rear axle has an outer end and an inner end, wherein said second rear wheel hub has an inner end and an outer end, wherein said second rear fork has an outer support arm for fixedly supporting the outer end of said second rear axle, an inner support arm spaced form said first support arm, and an intermediate support arm located between said inner support arm and said outer support arm, and wherein said drive connector comprises:

(a) a drive shaft having an inner end which is fixed to said driven member and rotatably supported on said inner support arm and outer end which is rotatably supported on said intermediate support arm;

(b) a coupler for fixing the outer end of said drive shaft to the inner end of said second rear wheel hub for rotatably supporting the inner end of said second wheel hub on said intermediate support arm and the inner end of said second rear axle is supported by the inner end of said second rear wheel hub.

7. A three wheel motorcycle as recited in claim 6, wherein said coupler comprises:

(a) an outer vertical flange fixed to the inner end of said second rear wheel hub;

(b) an inner vertical flange fixed to the outer end of said drive shaft; and (c) fastening means for fixing said outer vertical flange to said inner vertical flange.

8. A three wheel motorcycle as recited in claim 5, wherein each of said first and second rear axles is mounting on said sub frame for pivoting about a horizontal axis and said conversion assembly further comprises shock connectors between said sub frame and each of said first and second rear axles.

* * * * *